United States Patent [19]
Deodhar et al.

[11] Patent Number: 5,945,198
[45] Date of Patent: Aug. 31, 1999

[54] COATED WALLBOARD EMPLOYING UNBLEACHED FACE PAPER COMPRISING A COATING CONTAINING SOY PROTEIN

[75] Inventors: Subhash S. Deodhar, Vernon Hills; Thomas M. Haugeberg, Mundelein; Claudia B. Hill, Libertyville; Thomas G. Houman, Chicago; Robert H. Negri, Lake Villa, all of Ill.

[73] Assignee: United States Gypsum Company, Chicago, Ill.

[21] Appl. No.: 08/929,165

[22] Filed: Sep. 12, 1997

[51] Int. Cl.$^6$ .......................................................... B32B 5/16
[52] U.S. Cl. ........................... 428/143; 428/324; 428/328; 428/330; 428/341; 428/342; 428/491; 428/537.7; 428/703
[58] Field of Search .................................. 428/330, 537.7, 428/489, 328, 143, 153, 219, 341, 342, 491, 703, 324; 106/680, 715, 732, 735, 772, 778, 780

[56] References Cited

U.S. PATENT DOCUMENTS

| | | | |
|---|---|---|---|
| 3,951,735 | 4/1976 | Kondo et al. | 162/133 |
| 4,020,237 | 4/1977 | Von Hazmburg | 418/535 |
| 4,372,814 | 2/1983 | Johnstone et al. | 162/124 |
| 4,443,261 | 4/1984 | Nordqvist | 106/109 |
| 4,448,639 | 5/1984 | Long | 162/124 |
| 4,470,877 | 9/1984 | Johnstone | 162/124 |
| 4,548,676 | 10/1985 | Johnstone et al. | 162/135 |
| 4,551,384 | 11/1985 | Aston et al. | 428/312.6 |
| 4,853,085 | 8/1989 | Johnstone et al. | 162/128 |
| 4,959,272 | 9/1990 | Long | 428/537.7 |
| 5,305,577 | 4/1994 | Richards et al. | 52/799 |
| 5,320,677 | 6/1994 | Baig | 106/780 |
| 5,439,707 | 8/1995 | Nelli et al. | 427/258 |
| 5,558,710 | 9/1996 | Baig | 106/780 |

FOREIGN PATENT DOCUMENTS

| | | |
|---|---|---|
| AU-A1932292 | 1/1993 | Australia . |
| 61-209189 | 9/1986 | Japan . |
| 92869 | 1/1992 | Rep. of Korea . |

OTHER PUBLICATIONS

Appleyard, "Construction Materials—Gypsum and Anhydrite", *Industrial Minerals and Rocks*, 5th Editon, S.J. Lefond, ed., AIME, 1983, pp. 183–198.

*Primary Examiner*—Hoa T. Le
*Attorney, Agent, or Firm*—Greer, Burns & Crain, Ltd.; David F. Janci; John M. Lorenzen

[57] ABSTRACT

A coating for providing a cover sheet used in the manufacture of wallboard with a light colored finish without the use of manila top plies is disclosed. The coating has a porosity adapted to allow evaporation of moisture from the wallboard core through the cover sheet, and maintain a desired smooth appearance. A high pigment-to-binder ratio is used to provide porosity, with soy protein being added to further enhance the porosity of the coating. The coating may be applied through various conventional methods of coating paper such as roll, spray, curtain, rod and vacuum.

10 Claims, No Drawings

5,945,198

COATED WALLBOARD EMPLOYING UNBLEACHED FACE PAPER COMPRISING A COATING CONTAINING SOY PROTEIN

BACKGROUND OF THE INVENTION

1. Field of the Invention

The present invention relates to a coating for providing a cover sheet or face paper used in the manufacture of wallboard with a light colored finishing surface, and a wallboard using the same. More particularly, the present invention relates to a cover sheet composed of at least one ply of generally unbleached recycled paper which utilizes a coating in place of manila face plies to obtain a light colored finish.

2. Description of the Prior Art

Paper for gypsum board is conventionally made by pulping up waste paper constituents of old corrugated paper, or kraft cuttings and waste newsprint. In cleaning, screening and refining the suspended materials in water suspension, the processed paper stock is diluted still further with water and then formed by draining the plies of paper on several continuously moving wire cylinders, where the separate plies are joined together by a carrying felt, or, alternatively, by depositing one or more paper stock slurries on a single flat moving drainage wire of a Fourdrinier-type machine to created a single or multi-ply paper web. The weak paper web is then dewatered (dried) in a press section where water is pressed out of the web. The pressed paper is dried in a multi-cylinder drying section with steam added to each cylinder. The dried paper is subjected to a squeezing or calendering operation for uniformity in thickness and is then finally wound into rolls. Subsequently, this paper is utilized as paper cover sheets to form gypsum wallboard by depositing a calcined gypsum slurry composed of calcium sulphate hemihydrate upon a reverse side of the face paper, then placing the backing paper upon the slurry, and permitting the gypsum to set and dry. A more detailed description of a conventional method of manufacturing wallboard is disclosed in an article by Frank C. Appleyard entitled "Construction Materials", Industrial Minerals and Rocks, 5th Ed, AIME, 1983, and in U.S. Pat. No. 3,307,987, "Process of Making Gypsum Wallboard Having a Decreased Starch Content in the Gypsum Core." These references are now incorporated by reference.

Present day cover sheets which are used in the production of gypsum wallboard are of two kinds. The first is used for the paper cover sheets which are used for the back side of the wallboard, is formed of recycled wastepaper having many contaminants and has a generally dark color. The second type is used on the outer face side of the wallboard. This is the decorated side. It is generally formed as a multi-ply sheet with 2 to 7 filler plies which include clean hard stock waste paper furnishes such as kraft and boxboard cuttings. The color of the filler plies varies, though it has a generally dark appearance.

To provide a light, manila colored, smooth appearance on the exposed or decorated side, 1 to 2 top liner plies are provided, covering the filler plies. The top liner plies (manila face plies) consist mainly of soft stock furnishes such as flyleaf shavings and newspaper. A light colored finish is desirable for the face paper because it may be covered with relatively few coats of paint without the risk of the underlying color "bleeding" through the paint. The flyleaf shavings can be described as baled trim of magazines, catalogs and similar printed and unprinted material. Containing predominantly bleached chemical fibers, this face paper material may also contain as much as 10–40% by weight of clays and pigments from coating overlays.

As stated above, the 2 to 7 filler plies of the face cover sheets are formed of clean hard stocks such as kraft and boxboard cuttings. These particular furnish constituents are of such a nature that they are inherently strong. Equally important, they can develop further strength on refining. As a result of these favorable pulp qualities, the final total sheet strength of the gypsum board face cover sheets is predominantly dependent on the furnish make-up of the cover sheet's 2 to 7 filler plies. The refined hard stock fibers which form the filler plies are further identified with easy dewatering (drying), fast drainage, and easy drying. This translates into faster paper production and less energy requirements for drying. In addition, the resultant sheet filler structures are very open or highly porous. This further translates into easier gypsum board drying and faster board line speeds.

In sharp contrast, the furnish components of the 1 to 2 top liner plies which are used to provide a suitable light colored, smooth face appearance are generally formed of 70–80% by weight of flyleaf furnish, old magazine and trim, and 20% waste newsprint. These top liner plies have significantly different characteristics. The soft stock waste paper constituent is inherently weak in strength qualities and has minimal potential for increased strength development. In fact, it has been found that the top liner plies of flyleaf furnish and ground newsprint provide little if any strength to the finished total sheet. The high proportions of inert clays and fillers contained in the flyleaf shavings stock constituent further subtract from the integrity of the liner plies. Moreover, the soft stocks and clays contained in the manila top liner plies are historically noted for poor dewatering (drying), slow drainage, and difficult drying. This results in slower paper production and increased energy requirement for drying.

Briefly summarized, it can readily be seen that the current cellulosic furnish consisting of waste newspapers and flyleaf shavings that typically is used as top liners of the manila gypsum wallboard paper grade contributes to substantial furnish and operational problems. It provides negligible strength to the finished sheet. In addition, the pulp slurry dewaters (dries) with difficulty, thereby adversely affecting the draining and drying conditions of the total filler/liner sheet. This results in poorer machine operability, lower production rates, and increased energy requirements.

Obviously, one corrective measure to obviate these problem conditions would be to replace the current "waste" stocks with "virgin" stocks. This would allow for predictable liner ply strength and would eliminate the critical clays and fillers associated with the flyleaf overlays. However, the cost of doing so would be prohibitive.

Another corrective measure has been proposed by Long, U.S. Pat. No. 4,959,272 assigned to the United States Gypsum Company. Long teaches a paper cover sheet for gypsum wallboard which does not require the use of top liner (manila) plies. Instead, Long uses a coating composed of a light colored mineral filler and a binder which is applied to an exposed surface of the cover sheet. As noted by LaFarge in Australian Patent No. A-19322/92, the paper cover sheet disclosed by Long suffers from several disadvantages.

First, Long's method of producing the cover sheet is not capable of yielding a coating of sufficient thickness to withstand sanding commonly performed to finish joints between adjacent sheets of wallboard. A second disadvantage associated with Long relates to the method of manufacturing the cover sheet. Long teaches precoating the cover sheet at the paper machine as part of the paper making process. Specifically, Long describes applying the coating at the starch box on the calender stack at the dry end of a paper machine. Third, Long's method is disadvantageous as it results in heterogenous distribution of the coating on the surface of the cover sheet. This uneven distribution results in the cover sheet having a non-uniform appearance and also results in variation in porosity across the surface of the cover sheet.

In contrast, LaFarge discloses a conventional cover sheet having manila face plies, but which further includes a mineral coating. LaFarge's coating is provided to retard the yellowing of the face plies due to exposure to sun. However, cover sheets manufactured according to LaFarge are uneconomical as they suffer from all of the disadvantages of conventional cover sheets (poor drying, more expensive cover sheets), and further include the added expense of the coating.

In view of these and other deficiencies of the prior art, it is a general objective of the present invention to provide an improved coated cover sheet for gypsum wallboard which does not require the use of top liner plies to achieve a light colored finish, and which has a coating sufficiently durable to withstand a typical finish sanding operation.

A further objective of the present invention is to provide an improved, durable coating for a gypsum wallboard cover sheet which is sufficiently durable to withstand a sanding operation, and which is sufficiently porous to allow moisture from the core of the gypsum board to evaporate through the cover sheet.

Another objective of the present invention is to provide an improved gypsum wallboard having a finishing surface suitable for painting or vinyl coating and which is uniformly and sufficiently porous to prevent delamination of the cover sheet from the gypsum core.

Still another objective of the present invention is to provide an improved method for applying a durable coating to a cover sheet which does not require a large capital investment.

Yet another objective of the present invention is to provide a method of applying coating to the cover sheet on the wallboard assembly online without appreciably increasing the length of the line or affecting manufacturing speed.

SUMMARY OF THE INVENTION

The coating of the present invention facilitates the manufacture of wallboard having a light colored finish using a cover sheet composed of recycled, unbleached fibers without the need for 1 or more plies of a manila top liner. In addition to being cheaper to manufacture than conventional cover sheets using top liner plies, the coated cover sheet of the present invention also improves the drying characteristics of the board.

Conventional coating methods may be utilized in applying the present coating to a cover sheet. Advantageously, the present coating may be applied to the cover sheet on the wallboard manufacturing line, without significantly modifying or affecting a conventional process. Significantly, the preferred coating method may be implemented with a minimal capital investment, and without appreciably slowing the manufacturing process.

Also, the increased porosity of the present coating over conventional wallboard coatings enables the use of a greater applied coating weight. In turn, the heavier coating yields a more durable coating better able to withstand typical sanding and finishing operations.

The above advantages of the present invention are achieved by a paper cover sheet which includes: a base formed of one or more plies of generally unbleached paper, the top most of the plies having a face surface; and a coating applied to the exposed face of the topmost ply, for providing a finished face of light color. The coating preferably has a porosity sufficient to allow evaporation of moisture through the coating, and has an applied weight of between about 2.8 lbs/msf and about 5 lbs/msf (pounds per 1,000 ft$^2$ of board).

DESCRIPTION OF THE PREFERRED EMBODIMENT

The cover sheet of the present invention is composed of one or more sheets of conventional filler ply made from generally unbleached recycled paper. In the cover sheet of the preferred embodiment five plies are used. However, the specific number of plies is not critical, so long as the cover sheet has sufficient strength to support the gypsum core, and is thick enough to withstand sanding.

Several different compositions of recycled paper were tested and yielded satisfactory results. Satisfactory results were achieved with a paper formulation having hard stock and soft stock wastepaper furnish in proportions ranging from 3:2 to 19:1 (by weight). The hard stock wastepaper furnish can contain boxboard or container board cuttings such as double lined kraft, old corrugated container board or kraft carrier board. In contrast, the soft stock wastepaper can contain newsprint, office wastepaper or printing grade wastepaper furnish. As will be appreciated by one of ordinary skill in the art, strength, smoothness and porosity are all relevant criteria in selecting the composition of the recycled paper utilized. Other paper formulations of generally unbleached furnish are contemplated and fall within the scope of the present invention. Importantly, the cover sheet of the present invention does not require the use of special manila top liner plies to achieve a light colored appearance. Rather, the cover sheet is composed of one or more plies of generally unbleached recycled paper.

A coating composed primarily of a pigment and a binder is applied to an exposed or finishing surface of the cover sheet and provides the cover sheet with a light colored finish. Accordingly, the coating of the present invention enables the use of unbleached filler plies having a generally dark appearance, without the need for manila top liner plies. The pigment used in the present coating is selected from the group including $CaCO_3$, Mica, and $TiO_2$; however, the use of other pigments is contemplated.

A conventional binder such as polyvinyl acetate (PVAC) or a mixture of polyvinyl acetate and acrylic (ACR) may be used as the binder in the coating of the present invention. Preferably, a 2:5 ratio of PVAC and ACR by weight is used in an amount generally equal to between 6.5% and 14% of the total coating weight. However, the use of other binder materials is contemplated and falls within the scope of the present invention.

An important feature of the present invention is that the pigment-to-binder ratio is selected to provide a significantly porous coating. The coating of the present invention uses a greater pigment-to-binder ratio than conventional coatings, such as the coating disclosed by Long, in order to achieve a coating which is more porous than conventional wallboard coatings. A variety of pigment-to-binder ratios were tested, and satisfactory results were obtained with a pigment-to-binder ratio R (by weight), where 3:1<R<13:1. Preferably, the pigment-to-binder ratio R is between about 4:1 and about 8:1, and the preferred embodiment coating has a pigment-to-binder ratio of 8:1.

The porosity of the coating of the present invention is further enhanced through the addition of soy protein. Several tests were performed in which the use of an amount of soy protein was varied. Specifically, an amount of soy protein between about 0.4% and about 0.8% of the total coating weight appears to work satisfactorily. However, in the preferred embodiment, an amount of soy protein equal to about 0.4% of the total coating weight is used.

The increased porosity of the coating of the present invention is an important feature because it facilitates the use of a greater coating weight without unduly diminishing the overall porosity of the cover sheet. Excessive protein is to be avoided due to the generation of an unpleasant odor from the board on humid days after installation.

Another important feature of the present invention relates to the coating weight applied to the wallboard. The coating weight must be sufficiently heavy to yield a durable coating, while balancing other concerns such as porosity and cost. A coating weight ranging from about 2.8 lbs/msf to about 5 lbs/msf was determined to perform satisfactorily. However, the best results were achieved using a coating weight in the range of 4–5 lbs/msf.

The coating of the present invention may be applied to the cover sheet through a variety of known methods. Such methods may include roll, spray, curtain, rod and vacuum techniques. These conventional coating methods are well understood by those of ordinary skill in the art. Accordingly, an explanation of their efficacy is unnecessary. However, the use of a vacuum coater to apply the coating on the gypsum board assembly line is preferred because it facilitates a uniform distribution of the coating material. Further, the vacuum coater is preferably positioned upstream from the kiln used to cure the gypsum slurry (calcium sulphate dihydrate) and remove excess moisture from the wallboard. To this end, the overall porosity of the coating applied to the cover sheet must be sufficient to allow the excess moisture to evaporate through the cover sheet.

Depending on the method of application, the viscosity of the coating method must be adjusted slightly. Tables I–V depict the respective coating formulations used for vacuum coating, rod coating, curtain coating and spray coating of the face paper. Each of the formulations includes a pigment to binder ratio (by weight) over the range of about 4:1 through about 8:1, and an amount of soy protein between about 0.4% and about 0.8% (by weight) of the total coating weight. The formulations differ in the use of additives used to adjust the flow characteristics of the coating to the method of application.

TABLE I

VACUUM COATER FORMULA

| Material | Pounds |
|---|---|
| Water | 476.36 |
| Surfynol 440 | 14.00 |
| Soy Protein PX 047 | 3.79 |
| Amp-95 Amine Neutralizer | 3.23 |
| Tronox CR-821 | 52.25 |
| Atomite Calcium Carbonate | 522.53 |
| Kathon LX Biocide | 3.00 |
| Reichhold 40-100 PVAC/ACR | 130.63 |

TABLE II

VACUUM COATER FORMULA

| Material | Pounds |
|---|---|
| Water | 414.30 |
| Soy Protein PX 047 | 3.50 |
| Methocel 228 | 1.50 |
| Surfynol 440 | 4.00 |
| AMP-95 Amine Neutralizer | 1.00 |
| Atomite Calcium Carbonate | 700.00 |
| Mica P80F | 100.00 |
| DA-10 Defoamer | 1.00 |
| Kathon LX Biocide | 3.00 |
| Reichhold 40-100 PVAC/ACR | 142.00 |

TABLE III

ROD/SPRAY COATER FORMULA

| Material | Pounds |
|---|---|
| Water | 476.36 |
| Soy Protein PX 047 | 4.00 |
| Methocel 228 | 1.00 |
| Surfynol 440 | 5.00 |
| AMP-95 Amine Neutralizer | 1.00 |
| Tronox CR-821 | 50.00 |
| Atomite Calcium Carbonate | 500.00 |
| DA-10 Defoamer | 1.00 |
| Kathon LX Biocide | 3.00 |
| Reichhold 40-100 PVAC/ACR | 162.90 |

TABLE IV

ROD/SPRAY COATER FORMULA

| Material | Pounds |
|---|---|
| Water | 476.36 |
| Tamol 731 Anionic | 11.29 |
| Soy Protein PX 047 | 3.79 |
| AMP-95 Amine Neutralizer | 3.23 |
| Tronox CR-821 | 52.25 |
| Atomite Calcium Carbonate | 522.53 |
| Nopco NXZ Defoamer | 3.23 |
| Kathon LX Biocide | 2.45 |
| Reichhold 40-100 PVAC/ACR | 130.63 |
| Alcogum L-37 Thickener | 4.75 |
| Surfynol 440 | 24.00 |

TABLE V

CURTAIN COATER FORMULA

| Material | Pounds |
|---|---|
| Water | 388.80 |
| Surfynol 440 | 14.00 |
| Soy Protein PX 047 | 4.85 |
| AMP-95 Amine Neutralizer | 2.63 |
| Tronox CR-821 | 66.76 |
| Atomite Calcium Carbonate | 667.59 |
| Nopco NXZ Defoamer | 1.00 |
| Kathon LX Biocide | 3.00 |
| Reichhold Wallpol 40-100 PVAC/ACR | 166.90 |

In the formulations of Tables I–V above:

Alcogum L-37 thickener is manufactured by Alco Chemical Corp.—Division of National Starch and Chemical Chattanooga, Tenn. and is methacrylic acid, ethyl acrylate.

Amp-95 neutralizer is manufactured by Angus Chemicals Co.—Buffalo Grove, Ill. and is 2-amino-2methyl-1-propanol 95%.

Atomite calcium carbonate is manufactured by ECC America, Inc.—Roswell, Ga.

DA-10 is a proprietary defoamer manufactured by U.S. Movidyn Corp.—Chicago, Ill.

Dolocron 4512 is Dolomitic limestone manufactured by Specialty Minerals Inc.—New York, N.Y. and is calcium carbonate, magnesium carbonate.

Kathon LX is a proprietary biocide manufactured by Rohm & Haas Co.—Philadelphia, Pa.

Methocel 228 is a thickener manufactured by Dow Chemical Co.—Chicago, Ill. and is hydroxypropyl methycellulose.

Mica P80F is a pigment manufactured by the United States Gypsum Co.—Chicago, Ill. and is Muscovite, Feldspar, and Quartz Calcite.

Nopco NXZ is a proprietary defoamer manufactured by Henkel Inc.—Ambler, Pa.

Soy Protein PX047 is manufactured by Protein Technologies International—Subsidiary of the Ralston Purina Co.—St. Louis Mo.

Surfynol 440 is a nonionic surfactant manufactured by Air Products and Chemical, Inc.—Allentown, Pa. and is ethoxylated tetramethyl decyn diol.

Tamol 731 Anionic is a dispersant manufactured by Rohm & Haas Co.—Philadelphia, Pa. and is sodium salt of a carboxylated polyelectrolyte.

Tronox CR-821 is a white pigment manufactured by Kerr-McGee Chemical Corp.—Oklahoma City, Okla. and is calcium carbonate, magnesium carbonate.

Reichhold Wallpol 40–100 is manufactured by Reichhold Chemicals Inc.—Durham, N.C. and is a 40:100 blend of polyvinyl acetate (PVAC) and acrylic (ACR).

As listed in Table I, the preferred coating formulation for use with a vacuum coater is primarily composed of pigment constituents (calcium carbonate and titanium dioxide), a binder mixture of polyvinyl acetate (PVAC) and acrylic (ACR), in a water suspension. The coating further includes soy protein for increasing the porosity of the coating, a biocide for preventing the soy protein from decomposing, a surfactant and an amine neutralizer.

Water (approximately 49% by volume) is mixed with the surfactant (approximately 1.71% by volume) and soy protein (approximately 0.61% by volume) and allowed to disperse for 10 minutes. To this mixture is added the amine neutralizer (approximately 0.41% by volume), titanium dioxide (approximately 1.56% by volume), calcium carbonate (approximately 23.22 by volume), biocide (approximately 0.35% by volume), and a mixture of PVAC and ACR in a ratio of 2:5 by weight (approximately 14.43% by volume). An additional amount of water may be added as needed to adjust the viscosity of the coating.

Preferably, this coating is applied using a vacuum coater which is positioned upstream from the drying kiln. More particularly, the vacuum coater is positioned to coat the finishing surface of the cover sheet after the assembly of the wallboard, before the board enters the drying kiln.

While several particular embodiments of the coating for use in manufacturing gypsum board have been shown and described, it will be appreciated by those skilled in the art that changes and modifications may be made thereto without departing from the invention in its broader aspects and as set forth in the following claims.

What is claimed is:

1. A paper cover sheet particularly designed for use as the face sheet in manufacturing gypsum wallboard comprising:
   a base formed of one or more plies of generally unbleached paper, a topmost of said plies having a face surface;
   a coating applied to said face surface for providing a finished face of light color, said coating having a porosity sufficient to allow evaporation of moisture through said coating, and having an applied weight between about 2.8 lbs/msf and about 5 lbs/msf, a pigment and a binder in a pigment:binder ratio R (by weight) of between 3:1 and 13:1, and an amount of soy protein generally equal to between 0.4% and 0.8% of the total coating weight.

2. A paper cover sheet according to claim 1, wherein said coating includes a blend of Polyvinyl acetate (PVAC) and Acrylic (ACR) in a PVAC:ACR ratio by weight of 2:5 as a binder.

3. A paper cover sheet according to claim 2, wherein said coating includes a blend of PVAC and ACR in an amount generally equal to between 6.5% and 14% of the total coating weight as a binder.

4. A paper cover sheet according to claim 1, wherein said base is comprised of unbleached hard stock and soft stock wastepaper in proportions varying from 3:2 to 19:1 by weight.

5. A paper cover sheet according to claim 1, wherein said coating includes a pigment and a binder, and said pigment is selected from the group comprised of $CaCO_3$, mica, and $TiO_2$, and said binder is comprised of a blend of polyvinyl acetate and acrylic.

6. A paper cover sheet according to claim 5, wherein said base is comprised of unbleached hard stock and soft stock wastepaper in proportions varying from 3:2 to 19:1 (by weight).

7. Gypsum wallboard comprising:
   a core of calcium sulphate dihydrate having front and back surfaces;
   a back cover sheet on the back surface of said core comprised of generally unbleached paper;
   a front cover sheet on the front surface of said core formed of one or more plies of generally unbleached paper, a topmost of said plies having a face surface;
   a coating applied to said face surface providing a finished face of light color, said coating having a porosity adapted to allow evaporation of moisture through said coating, and having an applied weight between about 2.8 lbs/msf and about 5 lbs/msf, a pigment and a binder in a pigment:binder ratio R (by weight) of between 3:1 and 13:1, and an amount of soy protein generally equal to between 0.4% and 0.8% of the total coating weight.

8. Gypsum wallboard according to claim 7, wherein said coating includes a binder having a 2:5 blend of polyvinyl acetate (PVAC) and acrylic (ACR).

9. Gypsum wallboard according to claim 7, wherein said coating includes a blend of polyvinyl acetate (PVAC) and acrylic (ACR) in an amount generally equal to between 6.5% and 14% of the total coating weight.

10. Gypsum wallboard according to claim 7, wherein said coating includes a pigment selected from the group comprised of $CaCO_3$, mica, and $TiO_2$, and a binder comprised of a blend of polyvinyl acetate and acrylic.

* * * * *